United States Patent [19]
Stewart et al.

[11] Patent Number: 6,043,738
[45] Date of Patent: Mar. 28, 2000

[54] METHOD AND APPARATUS FOR IDENTIFYING REMOTE SENDING UNITS IN A VEHICLE

[75] Inventors: William D. Stewart; Dermot J. Murphy; Stephen T. McClelland, all of Antrim, Ireland

[73] Assignee: Schrader-Bridgeport International, Inc., Deerfield, Ill.

[21] Appl. No.: 09/105,631

[22] Filed: Jun. 26, 1998

[51] Int. Cl.⁷ .................................................. B60C 23/00
[52] U.S. Cl. ............................................ 340/447; 340/442
[58] Field of Search .................................. 340/447, 442, 340/445; 73/146.5, 146.8

[56] References Cited

U.S. PATENT DOCUMENTS

| | | |
|---|---|---|
| 4,609,905 | 9/1986 | Uzzo . |
| 4,909,074 | 3/1990 | Gerresheim et al. . |
| 5,054,315 | 10/1991 | Dosjoub . |
| 5,285,189 | 2/1994 | Nowicki et al. . |
| 5,289,160 | 2/1994 | Fiorletta . |
| 5,463,374 | 10/1995 | Mendez et al. . |
| 5,600,301 | 2/1997 | Robinson, III . |
| 5,661,651 | 8/1997 | Geschke et al. . |
| 5,731,516 | 3/1998 | Handfield et al. . |

*Primary Examiner*—Nina Tong
*Attorney, Agent, or Firm*—Brinks Hofer Gilson & Lione

[57] ABSTRACT

A remote tire pressure monitoring system includes a sending unit for each monitored tire, and the sending units transmit RF signals, each including an identifier ID(i) and a pressure indicator P(i). A receiver operates in a learn mode in which the receiver associates specific identifiers either with the vehicle or with specific tires. During the learn mode the vehicle is driven at a speed above a threshold speed, such as thirty miles an hour, and identifiers are associated with either the vehicle or the respective tires of the vehicle only if they persist for a selected number of signals or frames during the learning period. In one example, the tires are inflated with different pressures according to a predetermined pattern, and the pressure indicators of the receive signals are used to associate individual tire positions with the respective sending units.

12 Claims, 10 Drawing Sheets

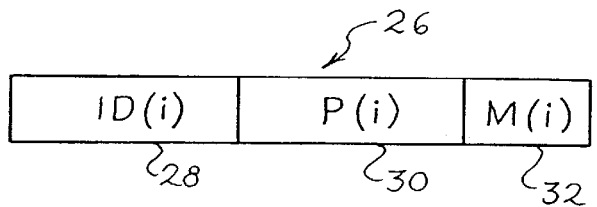
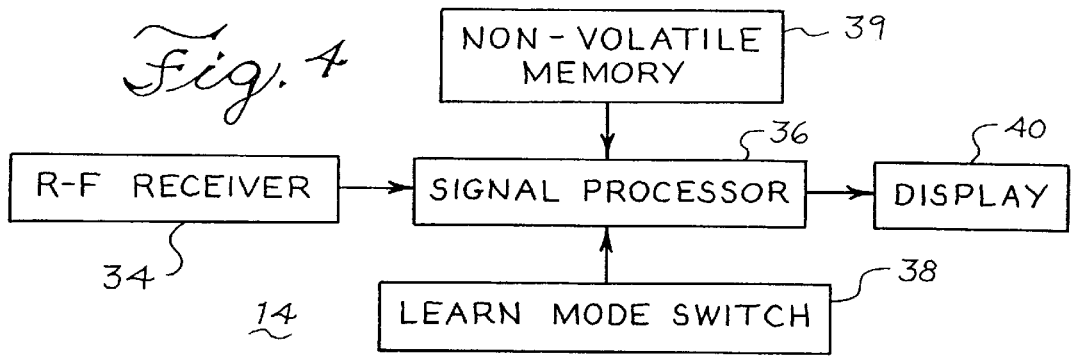
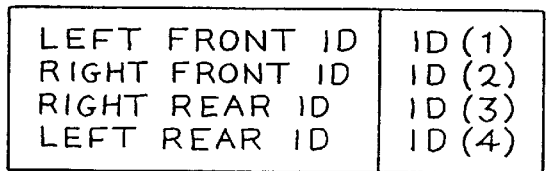
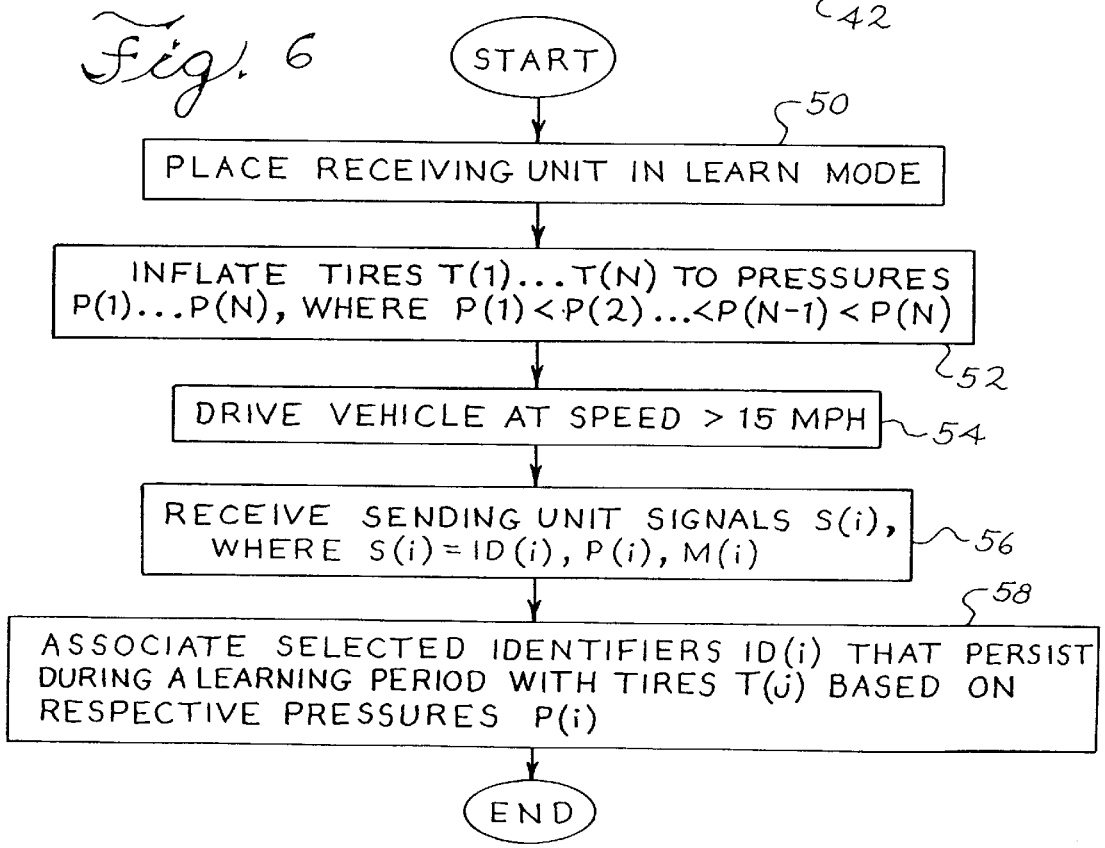

Fig. 7

| A | CONSTANTS | | |
|---|---|---|---|
| | PMIN | = | 15 PSI |
| | PMAX | = | 30 PSI |
| | MINFRAME | = | 20 |
| | MINTIME | = | 3 |
| | DELTA | = | 1 PSI |
| | MAX | = | 10 |

| B | VARIABLES | | |
|---|---|---|---|
| | LEARN ARRAY (0 = MAX) | = | LIST USED TO STORE DATA FOR RECEIVED TRANSMITTER SIGNALS |
| | TIME | = | NUMBER OF MINUTES SINCE LEARN MODE STARTED |
| | COUNT | = | NUMBER OF DIFFERENT TRANSMITTER ID'S STORED IN LEARNARRAY |
| | INDEX | = | LOOP COUNTER |

| C | LEARNARRAY STRUCTURE | | |
|---|---|---|---|
| | LEARN ARRAY(i) | = | RECTIME(i), RECFRAME(i), RECID(i), RECMAGNETFRAME(i), RECPRESSURE(i), |
| | RECTIME | = | TIME SINCE LAST RECEIVED FRAME FROM TRANSMITTER (i), |
| | RECFRAME | = | TOTAL NUMBER OF FRAMES RECEIVED FROM TRANSMITTER (i), |
| | RECID | = | ID OF TRANSMITTER (i), |
| | RECMAGNETFRAME | = | TOTAL NUMBER OF MAGNET FRAMES RECEIVED FROM TRANSMITTER (i), |
| | RECPRESSURE | = | LAST PRESSURE READING RECEIVED FROM TRANSMITTER (i) |

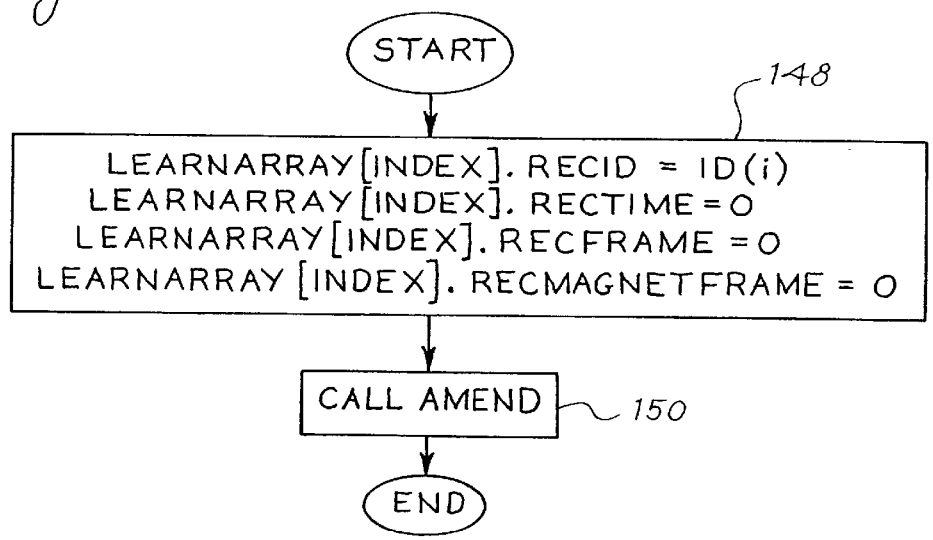
Fig. 14 NEWREC ROUTINE
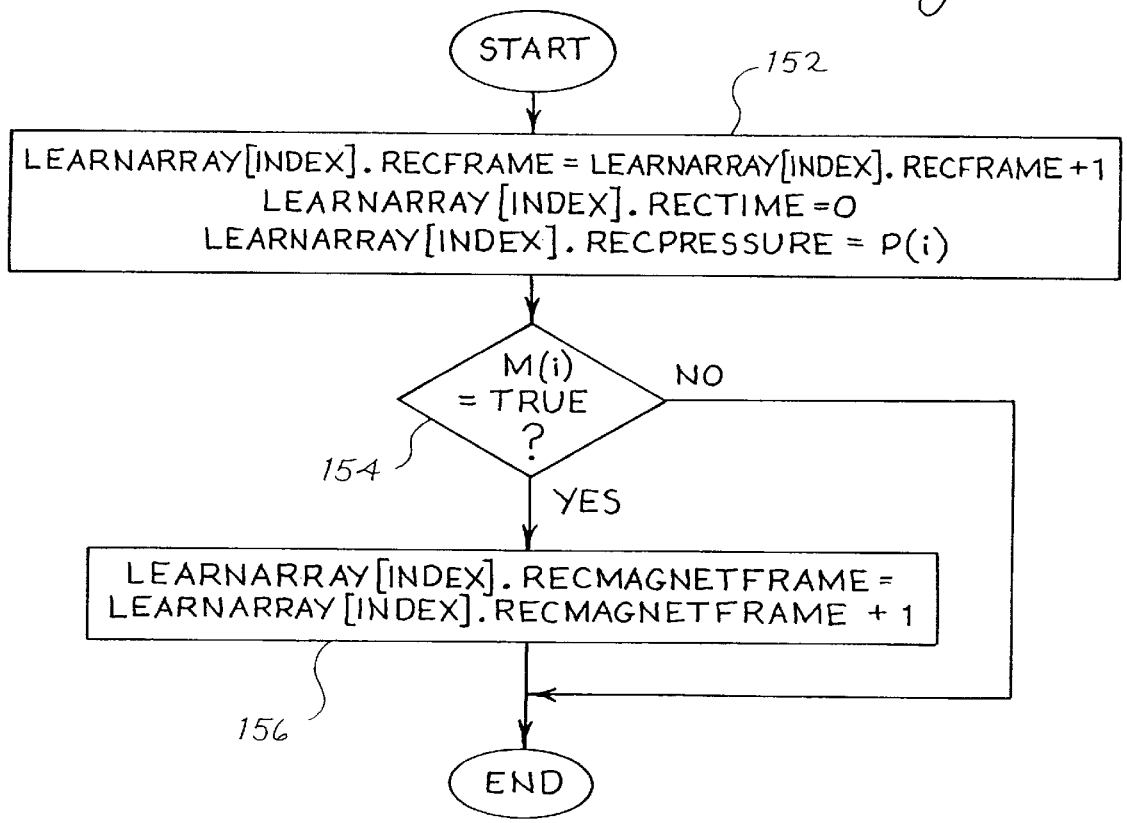
Fig. 15 AMEND ROUTINE

METHOD AND APPARATUS FOR IDENTIFYING REMOTE SENDING UNITS IN A VEHICLE

BACKGROUND

This invention relates to the programming of a central receiving unit to identify sending units such as radio-frequency tire pressure sending units associated with a vehicle.

U.S. Pat. No. 5,600,301, assigned to the assignee of the present invention, discloses a tire pressure monitoring system that includes sending units associated with each tire of a vehicle and a central receiving unit. Each of the sending units includes a respective radio-frequency transmitter that transmits an RF signal including both an identifier code and an indicator of tire pressure. Additionally, each of the sending units includes a magnet sensor. When the receiving unit is placed in a learn mode, a magnet is used to activate each sending unit of the vehicle in a predetermined order. The receiver learns the identifiers associated with the respective tires based upon the sequence of activation of the sending units. This approach has been found reliable in use, but it requires the user to have a suitable magnet for sequentially activating the sending units.

U.S. Pat. No. 5,731,516 describes a receiver that identifies transmitters associated with a vehicle by first recording the identification codes received from the transmitters. After recording the identification codes, the receiver verifies that the identified transmitters are installed on the vehicle by insuring that tire data is also received from the previously-identified transmitters.

One problem of the prior art is that physically adjacent vehicles may include sending units that transmit similar identification codes and pressure indicators on the same or a similar frequency. In this event the receiver can mistakenly record the identification code from an adjacent vehicle, instead of the desired identification code associated with the vehicle in which the receiver is mounted.

SUMMARY

The present invention is directed to an improved method and apparatus for allowing a receiver automatically to identify sending units associated with the vehicle.

This invention is defined by the following claims, and nothing in this section should be taken as a limitation on those claims. By way of introduction, the receiver described in the following detailed description automatically learns the identifiers associated with the sending units of the vehicle. In one method, radio-frequency signals transmitted by the sending units are received by the receiver, and the receiver stores information indicative of only selected identifiers that persist during a learning period while the vehicle is in motion. Because the vehicle is in motion, the chance that a neighboring vehicle will remain in the vicinity of the receiver-bearing vehicle during the learning period is substantially reduced.

In one embodiment described below, the tires of the vehicle are inflated with separate respective tire pressures which are chosen to fit a predetermined pattern. For example, the pressures proceeding clockwise from the front left tire can decrease in a monotonic fashion. Radio-frequency signals transmitted by the sending units are then received and the identifiers of respective sending units are associated with respective tires based on the associated pressure indicators. In this way, the receiver learns the identifiers associated with specific wheels of the vehicle automatically, and the operator is not required to use magnets or other selection devices.

BRIEF DESCRIPTION OF THE DRAWINGS

FIG. 3 is a block diagram of one of the RF signals generated by the sending unit of FIG. 2.

FIG. 4 is a block diagram of the receiving unit of FIG. 1.

FIG. 5 is a block diagram of a memory array included in the signal processor of FIG. 4.

FIG. 6 is a flow chart of a method implemented by the receiving unit of FIG. 4.

FIG. 7 is a list of constants and variables of a digital computer program implemented by the signal processor of FIG. 4.

FIGS. 8–15 are flow charts of a computer program implemented by the signal processor of FIG. 4.

DETAILED DESCRIPTION OF THE PRESENTLY PREFERRED EMBODIMENTS

Figure 1:
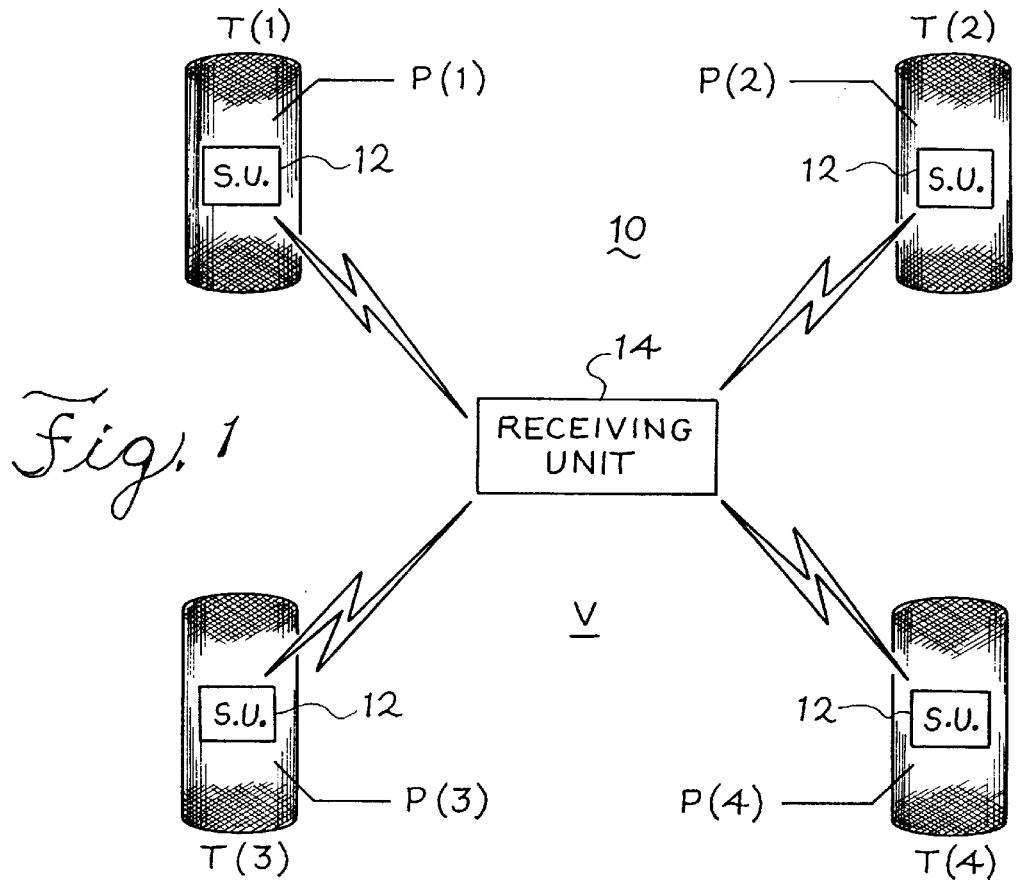
FIG. 1 is a schematic view of a remote tire pressure monitoring system that incorporates a preferred embodiment of this invention.

Turning now to the drawings, FIG. 1 shows a schematic view of a vehicle V that includes in this example four tires. The vehicle V includes a remote tire pressure monitoring system 10 that in this example includes four sending units 12 and a receiving unit 14. Each of the sending units 12 includes a battery-powered, radio-frequency transmitter that periodically transmits radio-frequency signals indicative of pressure in the associated tire. In this example, the tires are labeled T(1), T(2), T(3), T(4), and the associated tire pressures are identified as P(1), P(2), P(3), P(4). The receiving unit 14 receives radio frequency signals from the sending units 12 and provides a warning to the operator of the vehicle V when the indicated tire pressure of any of the tires is outside a predetermined range.

This invention can be used with the widest variety of sending units 12 and receiving units 14, and for this reason these components will be described only briefly here.

Figure 2:
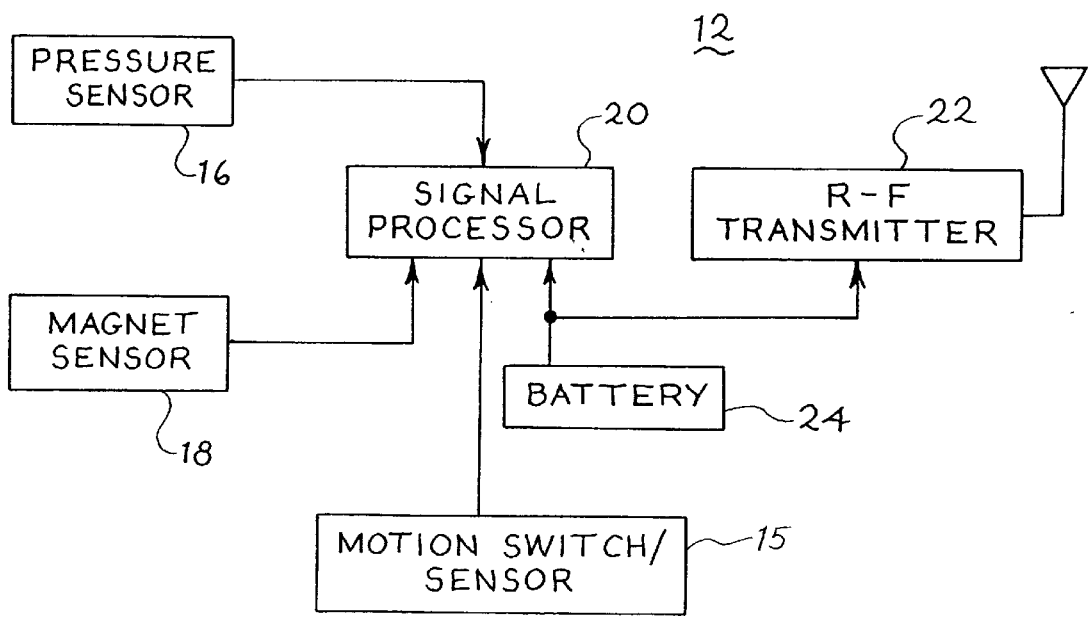
FIG. 2 is a block diagram of one of the sending units of FIG. 1.

As best shown in FIG. 2, each of the sending units 12 can include a motion switch/sensor 15, pressure sensor 16 and a magnet sensor 18 that provide input signals to a signal processor 20. The signal processor generates output signals which are transmitted by an RF transmitter 22. A battery 24 provides electrical power to the remaining components of the sending unit 12.

In this example, the RF signal transmitted by the RF transmitter 22 can take the form shown in FIG. 3. As shown in FIG. 3, the RF signal 26 includes three components: an identifier 28, a pressure indicator 30, and a magnetic frame indicator 32. The identifier 28 in this embodiment includes a digital variable ID(i) that is set equal to an identification code assigned to the respective sending unit 12. Each of the sending units 12 of the vehicle V will therefore have a different identifier 28. The pressure indicator 30 provides an indication of tire pressure in the respective tire. Preferably, the pressure indicator 30 takes the form of a digital variable P(i) equal to a measure of tire pressure, though other techniques are possible. For example, the pressure indicator 30 may take the form of a carrier frequency, wherein the carrier frequency is selected to indicate the associated tire pressure. Alternately, the pressure indicator 30 in some embodiments can be threshold based rather than providing an absolute measure of pressure. The magnet frame indicator 30 can be a single bit variable M(i) that identifies the RF signal (sometimes referred to as a frame in this description) as either generated in response to a magnetic field sensed by the magnet sensor 18, or not.

In this example, each of the sending units 12 transmits eight RF signals or frames per block, and one block of frames is transmitted every minute while the vehicle is in motion. When a magnet is used to initiate operation of one of the sending units, the respective sending unit transmits forty frames within a short period of time.

As shown in FIG. 4, the receiving unit 14 includes an RF receiver 34 operative to receive the RF signals 26 described above in conjunction with FIG. 3 and to supply the received RF signals to a signal processor 36. The signal processor 36 controls a display 40 and is responsive to a learn mode switch 38 and data stored in a non-volatile memory 39. For example, the signal processor 36 can automatically provide a display if the received signals indicate tire pressure for one of the tires T(1) . . . T(4) outside of a predetermined range. The learn mode switch 38 is used to place the receiving unit 14 in a learn mode, in which the receiving unit 14 automatically associates the identifiers of each of the sending units 12 associated with the vehicle V with the respective tires. As used herein, the term "tire" is intended broadly and in some cases is used to signify a tire position (e.g. the front left tire) as compared to a specific tire.

During the learn mode the signal processor automatically loads the identifiers ID(1)–ID(4) into respective rows of a memory block 42 as shown in FIG. 5. Once the memory block 42 is automatically loaded, the memory block 42 records the association between individual tires T(1)–T(4) and the corresponding identifiers ID(1)–ID(4). The memory block 42 can then be used by the signal processor 36 to determine which received RF signals are associated with the vehicle (as opposed to other, physically adjacent vehicles) and the tire or tire position associated with each received signal that is associated with the vehicle.

FIG. 6 provides a high level flow diagram of a method implemented by the receiving unit 14 in the learn mode. As shown in FIG. 6, the receiving unit is placed in a learn mode in step 50 in response to activation of the learn mode switch 38 of FIG. 6. Either before or after activating the learn mode switch, the user inflates the four tires of the vehicle T(1)–T(N) to pressures P(1)–P(N), where P(1)<P(2)< . . . <P(N−1)<P(N), as indicated in step 52. Then the user drives the vehicle at a speed greater than a selected speed (such as 15 miles an hour) for at least three minutes in step 54. During this period of time the receiving unit receives radio frequency signals S(i) from the sending units in step 56, where each RF signal S(i) includes an identifier ID(i), a pressure indicator P(i), and a magnet frame indicator M(i), as described above. In step 58 the receiving unit then associates selected identifiers ID(i) that persist during the learning period while the vehicle is in motion with specific tires T(j), based on the respective pressures P(i). This completes the learn procedure.

It should be noted that because step 58 only associates identifiers that persist during the learning period, there is a reduced chance that sending units of other, physically adjacent vehicles will be confused with the sending units of the vehicle of interest. This is because the vehicle of interest is moving at a speed greater than the selected speed, and therefore a parked vehicle which was initially near the vehicle of interest will not remain near the vehicle of interest during the learning period. Furthermore, in step 58 specific selected identifiers are associated with specific tires based on the respective pressure indicators. Since the tires were inflated in a specified pressure sequence in step 52, the pressure indicators received by the receiving unit provide an accurate association between specific identifiers and the respective tires.

FIGS. 7 through 15 provide further information for a computer program for implementing the method of FIG. 6. FIG. 7 provides introductory information regarding constants and variables used by the program flow charted in FIGS. 8 through 15.

As shown in FIG. 7, various constants 62 are used in the program of FIGS. 8 through 15. The constants PMIN and PMAX define the minimum and maximum tire pressures that are accepted as valid pressure readings, respectively. The constant MINFRAME defines the minimum number of frames or separate RF signals that are required from a particular sending unit before that sending unit is considered to have persisted through the learning period. The constant MINTIME defines the minimum time (in minutes) that must elapse since the last frame from a sending unit before that sending unit may be considered stale and removed from the buffer as described below. The constant DELTA defines the maximum pressure differential between two consecutive frames of data from a single sending unit that will be accepted. The constant MAX defines the size of the buffer used to store sending unit information.

The program of FIGS. 8 through 15 utilizes four main variables 64 as shown in FIG. 7. The variable LearnArray is a buffer that stores a list of records, each record storing data from received RF signals having a respective identifier. The LearnArray buffer is referred to as a list on occasion in this description. As shown in FIG. 7, each record 66 in the LearnArray buffer includes five separate variables 68. The variable RecTime is set equal to the time (in minutes) since the last frame was received from the associated sending unit. The variable RecFrame is set equal to the total number of frames received from the associated sending unit during the learning period.

The variable RecId is set equal to the identifier of the associated sending unit. The variable RecMagnetFrame is set equal to the total number of magnet frames received from the associated sending unit, and the variable RecPressure is set equal to the last pressure indicator received from the associated sending unit.

Figure 8:
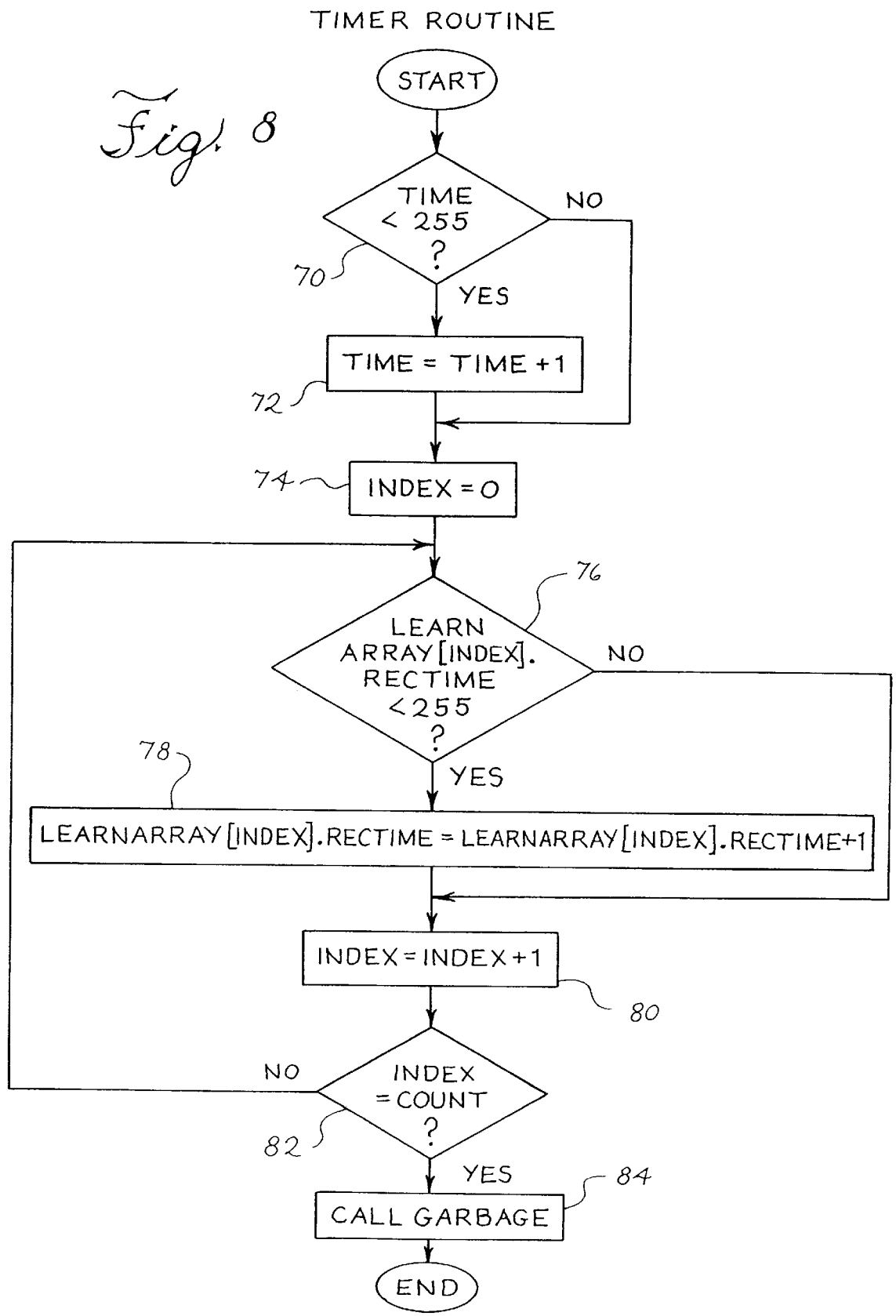
Figure 10:
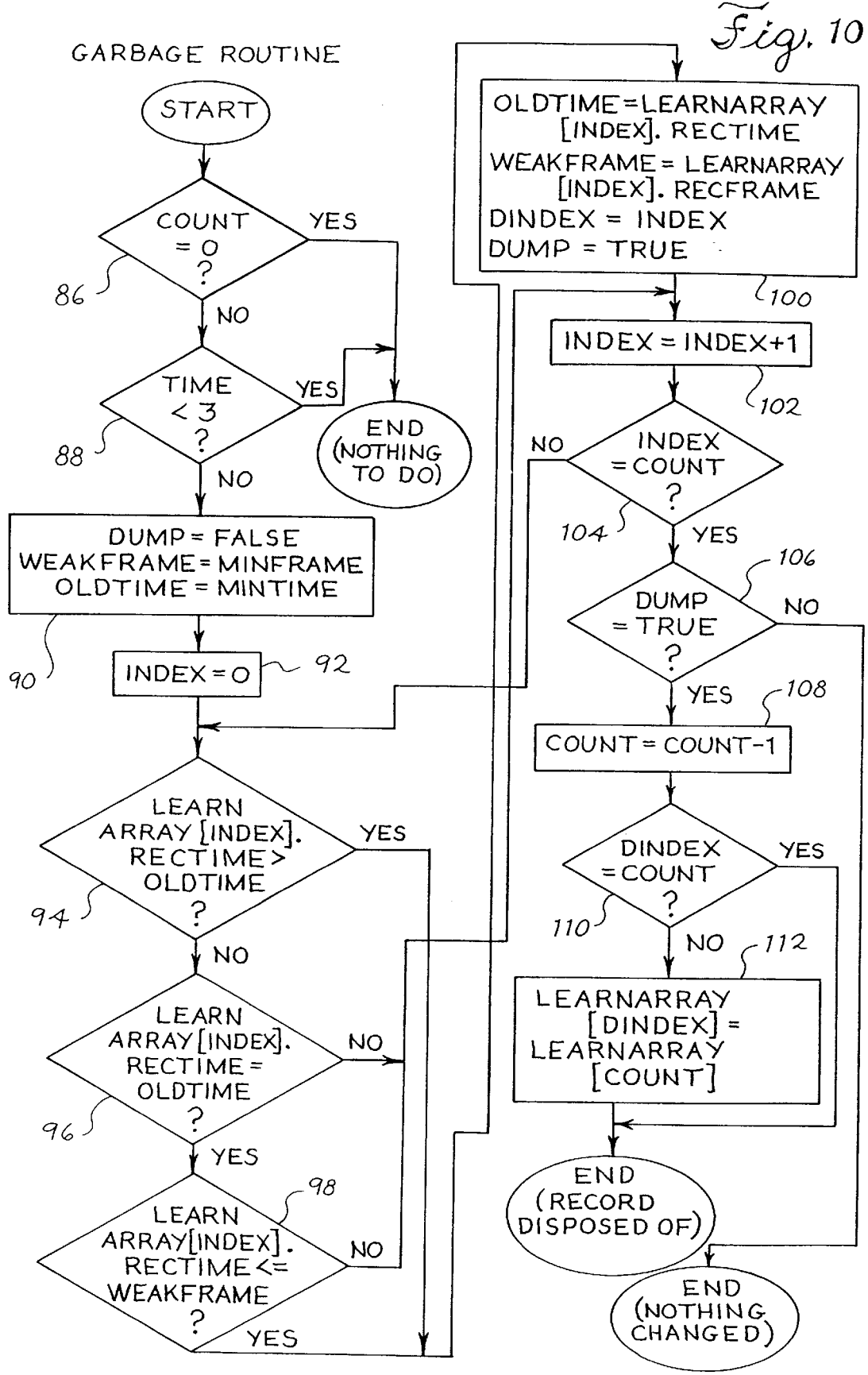

The timer routine of FIG. 8 including steps 70, 72, 74, 76, 78, 80, 82, 84, is executed once per minute, and it operates to increment the variable RecTime for each record in the LearnArray buffer. After this has been done, the garbage routine of FIG. 10 is executed. This routine in steps 86, 88, 90, 92, 94, 96, 98, 100, 102, 104, 106, 108, 110, 112, removes records from the LearnArray in certain circumstances. In particular, the garbage routine evaluates the variables RecTime and RecFrame for each of the records in the LearnArray. In the event that (1) at least one of the records in the LearnArray has a RecTime greater than three (indicating that no frame has been received from the associated sending unit in three minutes) and (2) that record has a value of RecFrame<20 (indicating that the associated sending unit has not transmitted sufficient RF signals and the record is incomplete), then (3) the garbage routine discards the incomplete record in the LearnArray having the largest value of RecTime, or one of the incomplete records in LearnArray associated with the largest value of RecTime and the fewest number of frames (as indicated by the variable RecFrame). In this way stale records are removed from the LearnArray.

Figure 9:
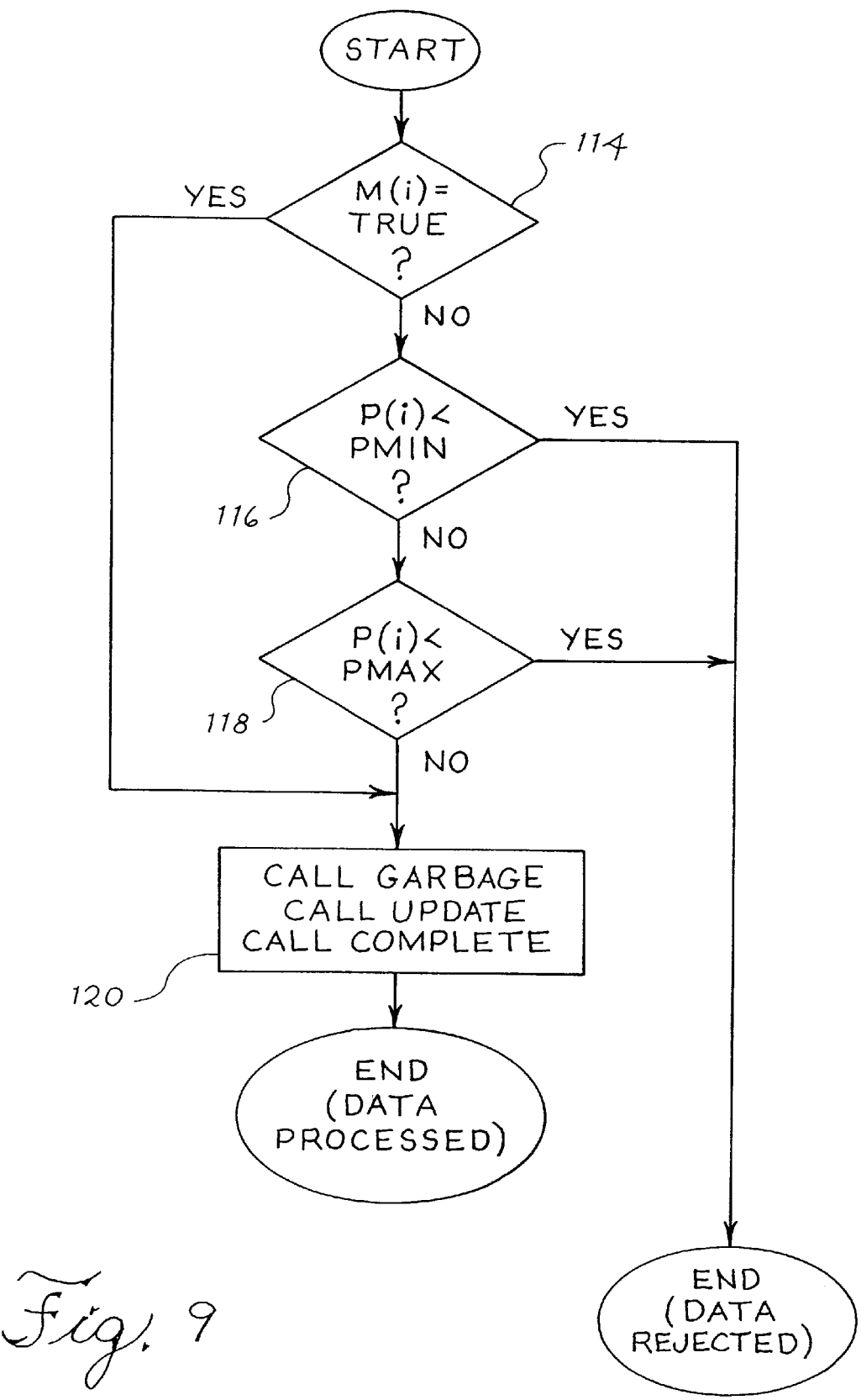
Figure 13:
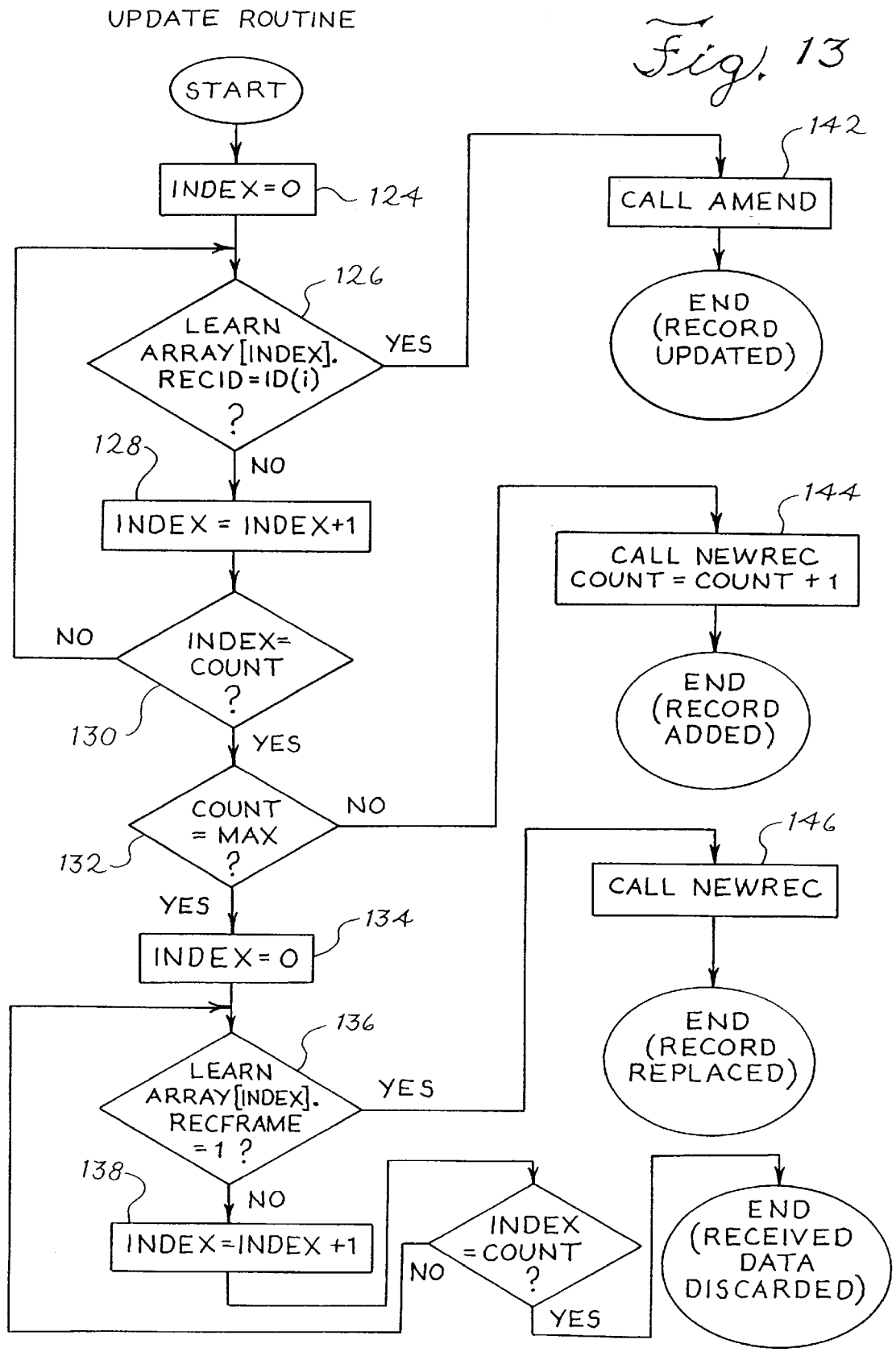

Every time a new RF signal or frame is received, the frame routine of FIG. 9 steps 114, 116, 118, 120, is called. This routine compares the pressure indicator of the associated frame with PMIN and PMAX (steps 116, 118), and only allows further processing if either the magnet frame indicator is set (step 114) or the pressure indicator indicates a pressure between PMIN and PMAX. If so, control is transferred (step 120) to the update routine of FIG. 13 (steps 124, 126). This routine checks to determine if the identifier of the associated frame is already stored in the LearnArray, step 126. If so, the associated record of the LearnArray is updated, step 142. Otherwise, a new entry is added to the LearnArray, step 128. The final loop of the update routine of FIG. 13 is executed only if the LearnArray is full, step 132. In this case, the final loop of the update routine removes a record of the LearnArray having the variable RecFrame equal to one (if such a record is present), step 136 thereby keeping only the new record.

The amend and new record routines called by FIG. 13 are flow charted in FIGS. 14, steps 148, 150 and 15 steps 152, 154, 156. The new record routine of FIG. 14 stores the identifier D(i) from the most recently received RF signal in the variable Recid of the associated record of the LearnArray and resets the variables RecTime, RecFrame and RecMagnetFrame for this record, step 148. The amend routine of FIG. 15 increments the variable RecFrame of the associated record of the LearnArray (to indicate that another frame of the associated sending unit has been received), resets RecTime to zero and sets RecPressure equal to the pressure indicator P(i) of the most recently received RF signal, step 152. The variable MagnetFrame is incremented, step 156 only if the magnet frame indicator M(i) is set in the associated frame, step 154.

Figure 11:
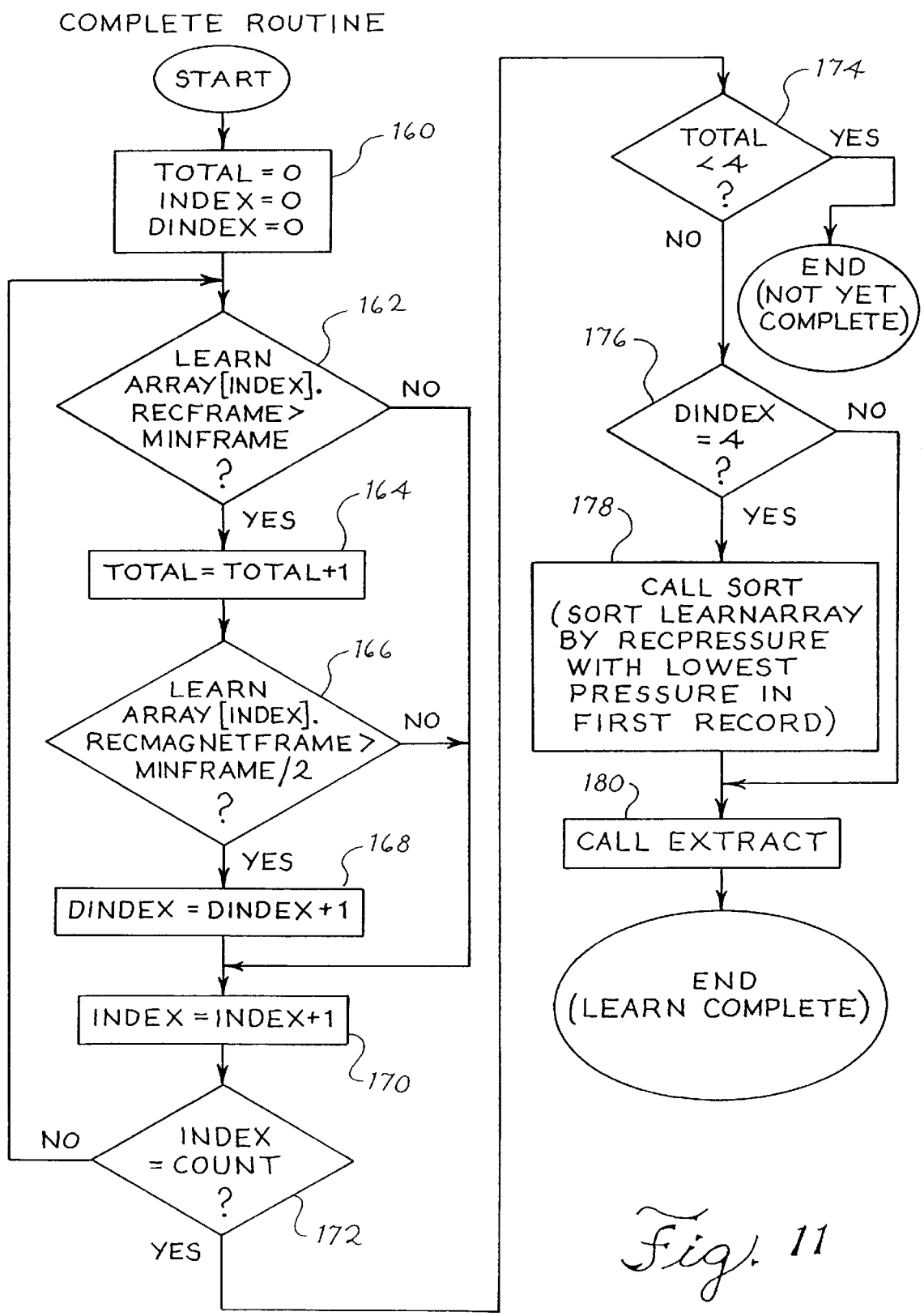
Figure 12:
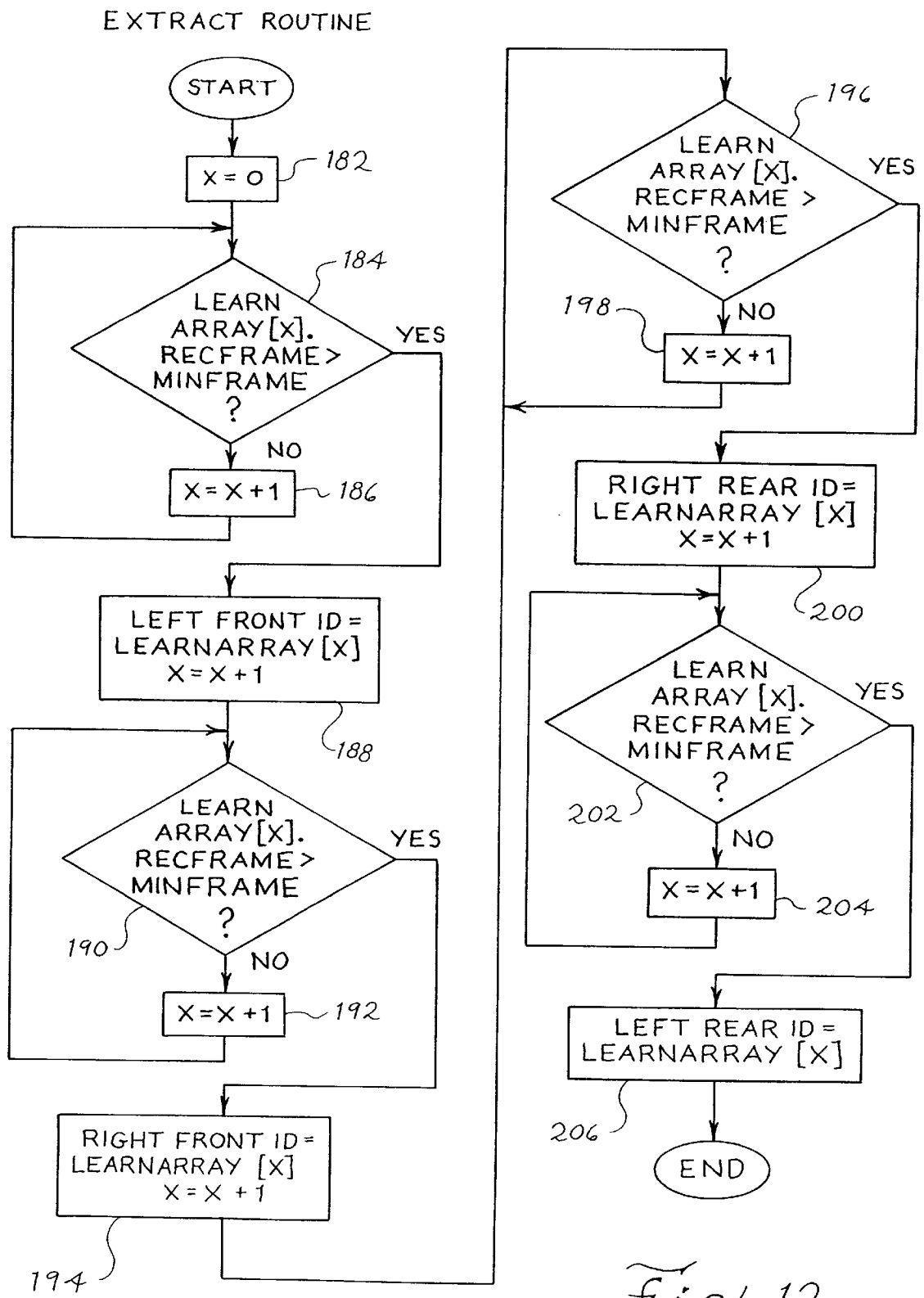

Returning to FIG. 9, after the update routine is called, the frame routine, steps 160, 162, 164, 166, 168, 170, 172, 174, 176, 178, 180, calls the complete routine of FIG. 11. The complete routine sets the variable Total equal to the number of entries of the LearnArray having the variable RecFrame greater than MINFRAME, steps 162, 164. Additionally, the variable DIndex is set equal to the number of entries of the LearnArray having the variable RecMagnetFrame greater than one-half of MINFRAME, steps 166, 168. Then the variable Total is compared to four step 174. If Total is less than four, the LearnArray does not yet contain four entries having an adequate number of frames. If TOTAL is equal to or greater than four, the complete routine of FIG. 11 then compares Dindex to four step 176. If DIndex equals four, indicating that the four entries of the LearnArray all correspond to sending units transmitting magnet frames, then the extract routine of FIG. 12 is called, step 180. If not, the complete routine of FIG. 11 calls a sort routine that sorts the LearnArray by RecPressure, with the lowest pressure positioned in the first record of the LearnArray, the second lowest pressure positioned in the second record of the LearnArray and so forth, step 178. The extract routine of FIG. 12 is then called.

As shown in FIG. 12, the extract routine, steps 182, 184, 186, 188, 190, 192, 194, 196, 198, 200, 202, 204, 206, finds the first record of the LearnArray having RecFrame greater than MINFRAME, step 184 and sets this first record equal to LEFT FRONT ID, step 188. In this way, the identifier associated with the sending unit sending the required number of frames and indicative of the lowest pressure is associated with the left front tire position T(1). The extract routine then finds the next record of the LearnArray having RecFrame greater than MINFRAME, step 190, and associates this record of the LearnArray with RIGHT FRONT ID, step 194. Thus, the next-to-lowest pressure received from a sending unit sending at least MINFRAME number of frames within the learning period is associated with the right front tire position. This continues until all four tires have been associated with the identifiers of the respective sending units, step 196, 198, 200, 202, 204, 206.

Once all four tires have been associated with a respective identifier, the complete routine terminates the learn mode.

Of course, many changes and modifications can be made to the preferred embodiment described above. For example, in embodiments where the receiving unit 14 does not identify which tire is outside of the desired pressure range to the user, the associating step 58 of FIG. 6 can be revised such that selected identifiers ID(i) are associated with the vehicle in the event those identifiers are received repeatedly during the learning period. There is no need in this case to associate selected identifiers with tires based on respective pressures. Also, the system may additionally include conventional modes of operation in which a magnet is used to consecutively activate the sending units of a vehicle in a manual learn mode.

As used herein the term "identifier" is intended broadly to encompass any aspect of a received signal that can indicate the source of the signal. As explained above, an identifier can comprise a digital code such as a binary code or a frequency such as a carrier frequency.

The term "indicative of pressure" is intended broadly to encompass signals that vary progressively with pressure (whether directly or inversely, linearly or non-linearly) or threshholded signals having one of a limited number of states in accordance with the detected pressure.

The term "associate" is intended broadly to encompass any storage of information that links an identifier with a respective vehicle or tire.

The term "extreme" is intended to encompass either the highest or lowest value in a sequence. An extreme value may be limited to the highest or lowest value that falls within an acceptable range, such as the range of pressures between the variables PMIN and PMAX in the foregoing example.

The term "tire" is intended broadly to encompass tire position, such as the left front tire of the vehicle.

Though the foregoing example has been stated in terms of a vehicle having four tires, it should be recognized that the embodiments described above can readily be adapted for use with vehicles having either more or fewer tires.

The foregoing detailed description has described only a few of the many forms that this invention can take. For this reason, this detailed description is intended only by way of illustration. It is only the following claims, including all equivalents, that are intended to define the scope of this invention.

We claim:

1. A method for identifying a set of radio-frequency sending units, wherein each unit associated with a respective tire of a vehicle, said method comprising the following steps:

a) receiving radio-frequency signals transmitted by the sending units to a receiving means, each radio frequency signal comprising an identifier associated with the respective sending unit; and b) storing information indicative of respective identifiers that persist during a learning period while the vehicle is in motion, with respective tires based on the respective tire pressure.

2. The method of claim 1 wherein each identifier comprises a respective digitally-coded signal.

3. The method of claim 1 wherein said step (b) comprises the step of storing information indicative of those identifiers that are received repeatedly over a persistence period greater than one minute while the vehicle is in motion.

4. The method of claim 1 wherein the radio frequency signals transmitted by the sending units comprise tire pressure indicators.

5. A method for Identifying and locating a set of remote tire pressure sending units during a learning period, each sending unit associated with a respective tire of a vehicle, said method comprising the following steps:

(a) inflating a set of tires comprising tires $T(1) \ldots T(N)$ with separate respective tire pressures $P(1) \ldots P(N)$, wherein each respective tire pressure is less than a next respective tire pressure $P(1) < \ldots < P(N)$;

(b) receiving signals transmitted by the sending units, each signal comprising an identifier associated with the respective sending unit and a pressure indicator indicative of a respective sensed pressure;

(c) associating with respective tires information indicative of the identifiers in accordance with the respective indicators.

6. The method of claim 5 wherein N=4; wherein the set of tires comprises tires $T(1)$, $T(2)$, $T(3)$, $T(4)$; wherein the tire pressures comprise pressures $P(1)$, $P(2)$, $P(3)$, $P(4)$; and wherein each tire pressure is less than a next tire pressure, $P(1)<P(2)<P(3)<P(4)$.

7. The method of claim 5 wherein step (c) comprises the step of associating with tire $T(1)$ information indicative of the identifier associated with the pressure indicator indicative of the lowest tire pressure.

8. The method of claim 5 wherein step (c) further comprises the step of associating with tire $T(n)$ information indicative of the identifier associated with the pressure indicator indicative of the $n^{th}$ lowest tire pressure.

9. The method of claim 5 wherein the signals are radio frequency signals.

10. An apparatus for identifying and locating a set of remote tire pressure sending units, each associated with a respective tire of a vehicle, said apparatus comprising:

means for receiving signals transmitted by the sending units to a receiving means, each signal comprising an identifier associated with the respective sending unit and a pressure indicator indicative of a respective sensed pressure;

means for associating respective tires with information indicative of respective identifiers, based on respective pressure indicators during a learning period.

11. The invention of claim 10 wherein the associating means comprises means for associating with tire $T(1)$ information indicative of the identifier associated with the pressure indicator indicative of the lowest tire pressure.

12. The invention of claim 10 where the associating means comprising means for associating with tire $T(n)$ information indicative of the identifier associated with the pressure indicator indicative of the nth lowest tire pressure.

* * * * *